United States Patent [19]

Ellis et al.

[11] 4,423,323

[45] Dec. 27, 1983

[54] NEUTRON LOGGING METHOD AND APPARATUS FOR DETERMINING A FORMATION CHARACTERISTIC FREE OF ENVIRONMENTAL EFFECTS

[75] Inventors: Darwin V. Ellis, Ridgefield; Charles Flaum, Danbury, both of Conn.

[73] Assignee: Schlumberger Technology Corporation, New York, N.Y.

[21] Appl. No.: 300,418

[22] Filed: Sep. 9, 1981

[51] Int. Cl.³ .............................................. G01V 5/00
[52] U.S. Cl. .................................... 250/264; 250/265
[58] Field of Search ............... 250/253, 256, 257, 264, 250/266, 269

[56] References Cited

U.S. PATENT DOCUMENTS

| | | |
|---|---|---|
| 3,321,625 | 5/1967 | Wahl . |
| 3,483,376 | 12/1969 | Locke et al. . |
| 3,566,117 | 2/1971 | Tixier . |
| 3,662,172 | 5/1972 | Youmans . |
| 3,701,902 | 10/1972 | Janssen et al. ...................... 250/265 |
| 3,775,216 | 11/1973 | Frentrop . |
| 3,789,219 | 1/1974 | Wilson ................................ 250/264 |
| 3,887,805 | 6/1975 | Schuster ............................. 250/264 |
| 4,035,639 | 7/1977 | Boutemy et al. ................... 250/264 |
| 4,047,027 | 9/1977 | Bateman et al. ................... 250/264 |
| 4,297,575 | 10/1981 | Smith, Jr. et al. .................. 250/265 |

OTHER PUBLICATIONS

Wahl et al., "The Dual Spacing Formation Density Log", *Journal of Petroleum Technology*, Dec. 1964.

Alger et al., "The Dual Spacing Neutron Log-CNL", *Society of Petroleum Engineers of AIME*, Paper No. 3565, Oct. 3, 1971.

*Primary Examiner*—Janice A. Howell
*Attorney, Agent, or Firm*—Stephen L. Borst

[57] ABSTRACT

A method for determining porosity or other formation characteristic of a sub-surface geological formation traversed by a borehole is claimed. A neutron logging tool is passed through the borehole while irradiating the formation with neutrons. The neutron logging tool includes a neutron source and first and second detectors spaced from the source by different distances. Neutrons exiting the formation are detected with the neutron detectors and count rate signals are generated. In response to these signals, an indication of porosity, substantially independent of error due to tool standoff from said borehole wall, is produced. In addition, values of tool standoff are also generated. These standoff values are then filtered by a filter to reduce statistical variations and are used to generate improved indications of porosity.

49 Claims, 5 Drawing Figures

NEUTRON LOGGING METHOD AND APPARATUS FOR DETERMINING A FORMATION CHARACTERISTIC FREE OF ENVIRONMENTAL EFFECTS

BACKGROUND OF THE INVENTION

1. Field of the Invention

This invention relates to well logging methods and apparatus for determining characteristics of the earth formations surrounding a borehole by irradiating the formations with neutrons and measuring the resulting spatial distribution of the neutrons within the formations. More specifically, the invention relates to a technique whereby inaccuracies in the determination of the formation characteristic as a result of standoff from the borehole wall or other environmental effects in the borehole, such as cement and casing, may be substantially eliminated.

2. Description of the Prior Art

Knowledge of the porosity of the earth formations surrounding a borehole is of fundamental importance in the petroleum industry. Reliable determinations of porosity are needed not only to identify possible oil or gas producing horizons, but also to calculate other important parameters, such as the maximum producible oil index of a specific formation. In a conventional technique described in U.S. Pat. No. 3,566,117 issued to M. P. Tixier on Feb. 23, 1971, the porosity, commonly referred to as the "neutron porosity", derived from a neutron-neutron logging tool may be compared with the value of porosity, commonly referred to as the "density porosity", derived from a gamma-gamma formation density logging tool of the type disclosed in U.S. Pat. No. 3,321,625 issued to J. S. Wahl on May 23, 1967 in order to detect the presence of hydrocarbon gas in the formation.

Porosity measurements are generally performed by a dual-detector neutron porosity logging tool provided with a neutron-emitting source that irradiates the formation under study. The tool is typically urged against one side of the borehole wall by tool eccentralizers. The resulting neutron population is sampled by a pair of neutron detectors spaced at different distances from the source. A tool of this sort is described in detail in U.S. Pat. No. 3,483,376 to S. Locke, patented Dec. 3, 1963. If the two-detector measurement is made at a sufficient distance from the source the effect of borehole size and tool standoff are minimized by taking the ratio of the counting ranges. A function former or equivalent system then conventionally converts the ratio into a signal that represents otherwise uncorrected formation porosity. Unwanted contributions to the "ratio porosity" may include contributions from elements of the environment of the investigation such as tool standoff, borehole size, mud cake thickness, borehole salinity, formation salinity, mud weight, etc. Correction of these environmental effects is subsequently conventionally accomplished in a separate operation by reference to a plurality of log interpretation charts. Such subsequent operations are a hindrance to on-site interpretation of the logging results. Clearly, it would be desirable to have a technique that would make "on-line" corrections, so that an on site continuous well interpretation could be conveniently made.

Unfortunately, full advantage of large source-detector spacing cannot be realized in practice. If the detectors are placed far enough from the source, the counting rate becomes unacceptably low. As a result, shorter source-detector spacings than the ideal are employed. This produces a tool response having reduced borehole and standoff effects but these effects are not completely eliminated. Experience has shown that attempts to decrease source-detector spacing in order to achieve higher counting rates result in a disproportionately greater change in the environmental influence on the far detector counting rate than on the near. In this event, the "ratio porosity" clearly is not free of borehole environmental effects.

Attempts have been made in the past to overcome the environmental effects disadvantage of neutron-neutron logging by making explicit measurements of the size of the environmental factor causing the effect and then making explicit corrections. U.S. Pat. Nos. 4,047,027 and 4,035,639 are exemplary of previous techniques that utilize this measurement and correction approach. While the technique disclosed in these patents has its merits, it has the disadvantage of requiring the additional apparatus necessary for making an explicit measurement of standoff. This being the case, it is not suitable for use with the current commercial neutron-neutron logging tools unless a major effort is undertaken to retrofit each tool with a tool standoff sensor. In addition, the porosity answer product will necessarily include an additional source of uncertainty due to the error of the standoff measurement.

Of all of the possible detrimental environmental effects, tool standoff is perhaps the most significant. In order to reduce the amount of time spent in the borehole during logging operations, recent practice has been to mate two or more logging tools together end to end. It will be recognized that this pracrtice of logging with combination tool strings tends to increase the likelihood that the neutral porosity tool will not closely follow the borehole wall but will tend to bridge over borehole irregularities created during the drilling operation so as to occasionally and unpredictably produce tool standoff.

Heretofore, most commercial dual detector neutron-neutron logging has been accomplished with thermal neutron detectors due to the fact that reasonable counting rate statistics are obtainable at source-detector spacings which yield values of porosity that are not too badly degraded by borehole environmental effects. However, because the measurement of porosity is based on the detection of thermal neutrons, the presence of thermal neutron absorbing elements in the formation or the borehole complicates the interpretation of the results. Such elements in the formation are commonly associated with clay and/or salt water. It is known how to derive information on clay types by means of logging tools that detect natural radioactivity. Unfortunately, the elements responsible for the natural radioactivity of clay are not the same as the thermal absorbers that interfere with the thermal neutron logging tool.

The importance of the influence of thermal neutron absorbers in the borehole or formation becomes apparent when it is understood that the earlier mentioned comparison of "density porosity" with "neutron porosity", in order to obtain an indication of hydrocarbon gas, becomes suspect where there are thermal neutron absorbers in the formation.

Thus a need is felt to turn to epithermal neutron detection which is insensitive to the presence of thermal neutron absorbers in the formation. Doing so is not as straight forward as one would like, however, due to the reduction in count rate and the consequent loss of statistics inherent in epithermal neutron detection as compared to thermal neutron detection. Attempts at improving the count rates and therefore the statistics of the measurement by moving the epithermal neutron detectors closer to the source have been frustrated by the deterioration of the porosity signal obtained by the near to far ratio technique of interpreting the data due to the increase detrimental influence of environmental effects such as tool standoff from the borehole wall and borehole size.

In a completed well, relative positions of casing and cement as well as the position of the sonde in the borehole have an appreciable effect on the determination of neutron porosity of the formation behind casing. It is very difficult to correct for this effect, since the exact geometry of casing and cement is rarely known. Thus, it would be desireable to have a neutron-neutron logging tool whose porosity determination of the formation behind the casing of a completed well is not subject to large uncertainites due to the nonuniformities of the casing and cement job in the completed well.

Reduction in count rate and the consequent loss of statistics also become a significant limiting factor on faster logging which is desireable in this age of increased urgency for the discovery of produceable hydrocarbons. Greater logging speeds would become possible by moving the detectors closer to the source if a suitable technique could be found to overcome the degradation of the determination of porosity that results from the enhanced effects of the environment of the investigation that occur when the detectors are moved closer to the source.

As previously mentioned, the dual detector neutron-neutron logging tool is normally run in an eccentered condition in order to minimize standoff effects. This requirement limits the tools with which the neutron logging tool may be combined to other tools that are also run in an eccentered condition. It would clearly be desireable for the neutron tool to be independent of standoff effects so that it could be combined with other tools normally run in a centered condition such as the dipmeter and sonic logging tools.

Finally, in some producing wells that have a tendency to sand, a conventional technique is to provide a "gravel pack" through which the well fluids are flowed. Such a gravel pack filters the produced fluid and prevents the sand particles from entering the production tubing. It would be of great value to have a logging technique that would enable determination of the location and vertical extent of the gravel pack in order to assure that the sanding zone has been adequately covered.

SUMMARY OF THE INVENTION

These and other improvements are now within reach with the discovery that detrimental environmental effects, such as tool standoff, may be greatly reduced in a relatively easy manner according to the technique of the present invention. The discovery on which the invention is based includes the realization that the dual detector neutron-neutron logging tool responds in such a manner that when only the porosity of the formation is varied, ie. all environmental conditions such as standoff, etc. are invariant, the count rate of the near detector and the count rate of the far detector change together to exhibit a unique or ideal response; and that when all conditions including the porosity of the formation are fixed, except for, for example tool standoff, borehole size, casing/cement thickness, or gravel pack quality, then the count rate of the near detector and the count rate of the far detector change together to exhibit a unique response considerably different from the ideal tool response above. Furthermore, it has been discovered that if the count rates are plotted against each other on a log-log plot, then the response of the dual detector neutron-neutron tool in the latter situation in which only the standoff changes, is a linear response for a substantial range of standoff values, having the interesting characteristic that families of these linear responses, each for a different porosity, converge toward the same point.

Advantage of the above discoveries has been taken in the proposal of the present invention for converting the near and far detector count rates of a dual detector neutron-neutron logging tool into a determination of porosity that is automatically corrected on line at the well site for one or more environmental effects such as standoff and/or borehole size. This is to be contrasted with the conventional near to far neutron detector counting rate ratio technique which produces a determination of porosity adulterated by these unwanted environmental effects. Utilization of this invention enables the previously mentioned improvements in the field of oil well logging such as epithermal neutron detection, on line determination and correction for standoff effects, determination of the quality of a gravel pack, enhancement of logging speeds and automatic correction for the condition of the casing and the cement in a completed well without explicitly determining the details of such condition. In addition to these improvements, such a technique makes it possible to modify a conventional dual detector neutron logging tool by moving the detectors closer to the neutron source to improve counting statistics, by using a source of lesser intensity or by combining the tool with other tools normally run in a borehole centered condition.

The proposed logging method for investigating the porosity of a sub-surface geological formation traversed by a borehole includes the steps of passing a neutron logging tool through the borehole while irradiating the formation with neutrons and detecting neutrons by a near and a far detector spaced from the source by different distances. Signals indicative of the near detector count rate and the far detector count rate are thus generated. With the aid of an empirically or mathematically derived tool response to variations only in standoff and/or borehole size, the logarithms of the count rates are compared to another empirically or mathematically derived tool response to variations only in porosity. As a result, a tangible representation of formation porosity corrected for the effects of standoff and/or borehole size is generated.

A further aspect of the present invention is the determination of tool standoff, effective cement/casing thickness, or gravel pack quality from the relation between the logarithms of the count rates and the empirically derived response curves without an explicit downhole measurement. This determination of standoff, effective cement/casing thickness, or gravel pack quality from the count rates may then be filtered in response to a borehole size determination and used to redetermine an improved porosity having reduced statistical noise.

In still a further aspect of the present invention, an ideal tool response to variations only in porosity may be determined for each of a plurality of different borehole or casing sizes. Each of these ideal tool responses is associated with a family of responses to variations only in standoff or other environmental effect. Knowledge of the borehole or casing size may then be utilized to choose the ideal tool response and its associated family of responses to variations only in standoff (or other environmental effect) in order to practice the invention.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE BEST MODE OF THE INVENTION

While the invention is susceptible to various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

Figure 1:
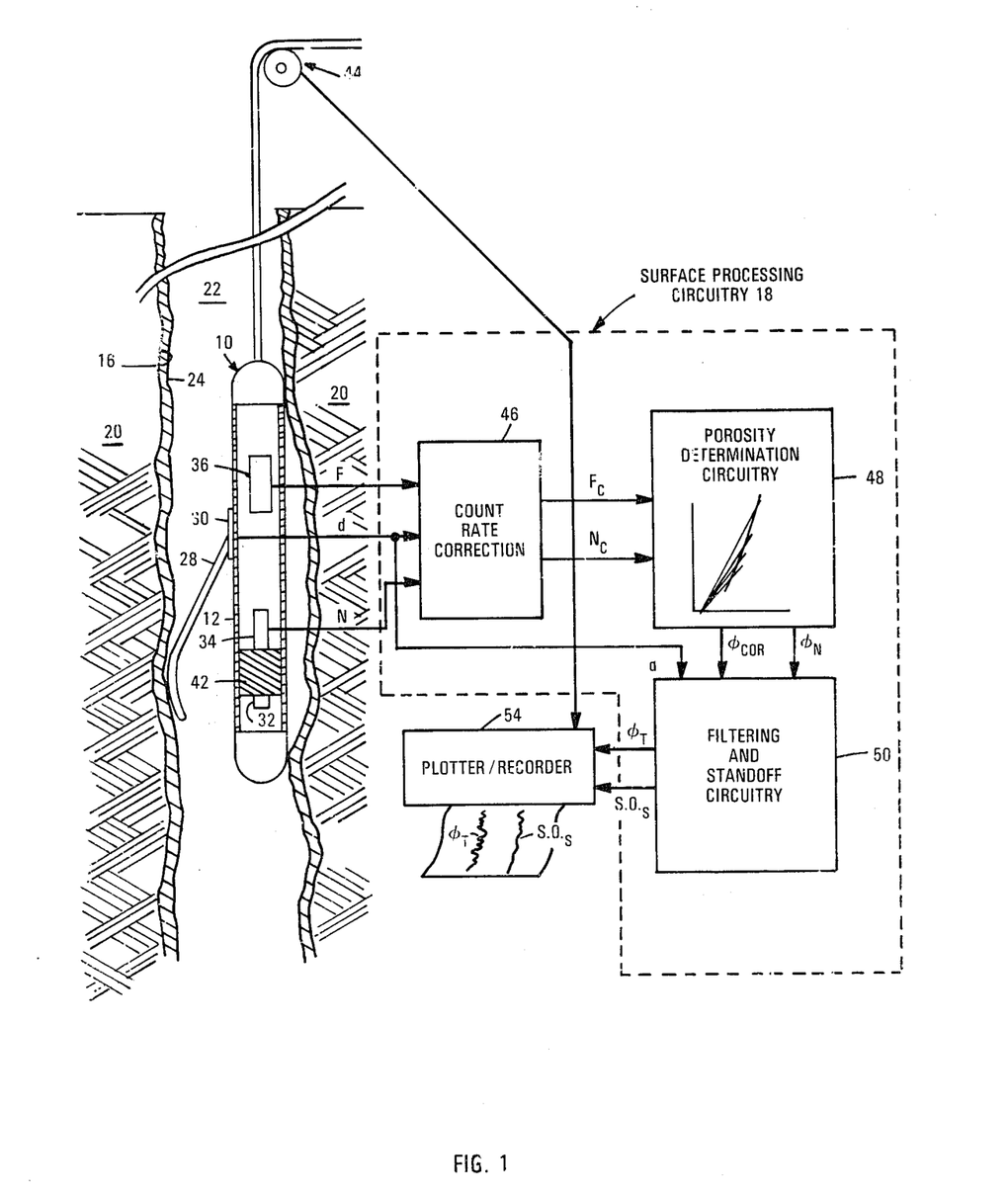
FIG. 1 illustrates in schematic form a first embodiment of the present invention.

An illustrative embodiment of a practical apparatus embodying the principles of the invention is shown in FIG. 1. The sonde or borehole logging tool 10 consists of a pressure-resistant housing 12, suspended by an armored cable 14 in a borehole 16. Cable 14 comprises insulated conductors that electrically connect the equipment within the housing 12 with a data processing system 18 at the earth's surface which may comprise a digital apparatus such as a PDP-11/34 made by the Digital Equipment Corp. and specially modified, as by stored instructions, to carry out the present invention. A winch (not shown) is located at the surface and is used to lower and raise the sonde 10 in the borehole 16 to traverse earth formations 20.

The borehole 16 may be dry or more commonly may be filled with drilling mud 22. During the drilling process, the liquid portion of the drilling mud flows into the porous formations 20 leaving behind a deposited layer of solid mud materials in the form of a mudcake 24. To reduce the influence of the mud 22 on the response of the sonde 10, a decentralizing mechanism 26 urges the sonde 10 against one side of the borehole wall to prevent the mud 22 from intervening between the sonde 10 and the formations 20. On occasion, however, the borehole 16 may be washed out or otherwise eroded or may contain other irregularities so that the sonde 10 is incapable of being urged flush against the formation 20 so as to create a tool standoff condition as shown. Decentralizing mechanism 26 includes a resiliently activated arm 28 physically attached to the housing 12 and a transducer 30 which produces a caliper measurement of the diameter of the borehole.

A neutron source 32, having a yield of typically $4 \times 10^7$ neutrons per second, is located in the lower portion of the sonde 10. Typically, the source 32 is a "chemical" neutron source, for example, a mixture of plutonium and beryllium or americium and beryllium. Alternatively, neutron source 32 may comprise a neutron generator of the ion accelerator type, an example of which may be found described in U.S. Pat. No. 3,775,216 issued to Arthur H. Frentrop on Nov. 27, 1973 and assigned to the assignee of the present invention. Each of these neutron sources is isotropic and emits neutrons with equal probability in all directions.

The neutrons emitted from source 32 diffuse through the formations 20 and are registered by a near-spaced neutron detector 34 and a far-spaced thermal detector 36. Typically, these detectors each comprise a hollow cylindrical cathode filled with a neutron sensitive gas, helium-3 or boron-trifluoride, for example. An anode wire (not shown) in the center of the cylinder creates a voltage gradient through the gas-filled cylinder, that enables ionized nuclear particles, produced as a consequence of neutron absorption within the gas nuclei, to establish charged pulses in the detector electrodes. The far-spaced detector 36 has a much larger volume than the near-spaced detector 34 and is typically filled with the $He^3$ gas at a higher pressure in order have enhanced sensitivity to neutrons as compared to the near-spaced detector. This arrangement of detectors having different sensitivities is provided to compensate for the exponential decrease in neutron population with separation from the source 32. A neutron shield 42 is typically positioned between the near detector 34 and the source 32 in order to reduce the direct irradiation of the near detector by neutrons from the source and in order to increase the porosity sensitivity of the tool.

Near and far spaced detectors 34 and 36 may be designed to detect epithermal neutron populations as opposed to thermal neutron populations. In such a case, the epithermal neutron detectors are similar to the thermal neutron detectors but include a cadmium or other neutron absorbing sleeve which preferentially absorbs neutrons having energies below an energy threshold characteristic of the shielding material. In addition, due to the decreased counting rates when detecting epithermal neutrons, detectors 34 and 36 may be located at different optimal distances from the source (generally nearer than thermal neutron detectors) and may be pressurized to a greater degree than thermal neutron detectors.

Pulses from detectors 34 and 36 are accumulated in appropriate circuitry (not shown) in order to generate count rate signals indicative of the neutrons detected per second by each of the individual detectors. Alternatively, detectors 34 and 36 and the associated electronic circuitry may generate signals indicative of the total energy deposited in the respective detectors, which is functionally related to the count rate. For purposes of convenience, the signals generated by detectors 34, 36 will hereafter be referred to in terms of count rates but it will be recognized that the invention is not so limited.

These signals are transmitted in a known manner with known equipment to the surface instrumentation via cable 14 after undergoing various degress of signal processing and conditioning dependent upon the telemetry equipment provided in the sonde and at the surface.

While the sonde is being raised through the length of the borehole, an indication of depth in the borehole is derived from a depth registering apparatus generally indicated at 44 which is typically reponsive to the motion of the logging cable as it is reeled in by the winch. The signals from the detectors 34 and 36, after having been transmitted to the surface processing circuitry 18, are converted according to the principles of the present invention into tangible representations of porosity in the form of a log or trace over a depth range.

In the embodiment of FIG. 1, near and far detector signals from detectors 34 and 36 first undergo a plurality of corrections. Typical corrections applied to the signals by element 46 are count rate calibrations and dead time corrections. Briefly, it is well known that the logging apparatus of such a tool must be calibrated against standard or known conditions. Such calibration is normally performed by placing the tool in a known "standard" or "test" formation at the surface and registering the count rate generated by the various detectors in response to this "standard". Accordingly, the subsequently applied calibration or normalization corrections applied by element 46 to the real count rate signals from an unknown formation, adjusts for any variations in tool behavior such as decreased detection sensitivity.

The other typical correction applied by element 46 is the correction for electronic dead time losses, since the electronic equipment utilized in the accumulation and transmission of pulses generated by the detectors in response to the detection of neutrons is not ideal. One expects, and indeed can quantify, losses in detector count rates due to these electronic deficiencies. Once quantified (again at the surface under known ot standard conditions), the count rate signals transmitted from the logging tool to the processing circuitry 18 can be corrected to make up for the dead time losses. The intricacies of these corrections will not be gone into here as they are conventional, well known, and do not constitute an essential part of the present invention.

One additional correction applied by element 46 is a borehole size correction. As previously described, the borehole diameter may not be uniform but may be enlarged over the nominal bit size for one reason or another. Unfortunately, tool response is dependent on the borehole size due to the influence on the neutron population of the mud in the borehole. In this first embodiment, the count rate signals from the neutron detectors 34 and 36 are corrected, on line, for borehole size effects as follows.

Count rate data is accumulated by running the logging tool, or one of similar design, in a plurality of formations having different porosities for each of a number of borehole sizes. Each set of count rates for a given borehole size represents a response curve that can be represented as a straight line when plotted on a graph of the logarithm of the count rate versus porosity ($\phi$) raised to a power having a value of approximately 0.5 and which is selected to force the straight line. When all the data are plotted together, it is observed that each set of data has a unique Y intercept (representing the logarithm of the count rate of the detector in a formation having zero porosity) and that all curves pass approximately through the same point (the water point where porosity is equal to 100%). Replotting the Y intercept of these sets of data against the borehole size produces a response curve which can be parameterized by a quadratic fit of the form $$Y_d = A + \frac{B}{d - C} \tag{1}$$

where Y is the Y intercept described above, d is the borehole diameter and A, B and C are the fitting parameters which generally correspond respectively to the logarithm of the detector count rate at zero porosity and infinite borehole size, the sensitivity of the tool response to borehole size and the approximate tool diameter.

From the above, a relationship can be determined, representing a simple scale transformation, that converts the logarithm of the count rate for a given detector in a borehole having a diameter "d" as determined by caliper 30, to the logarithm of the count rate that the detector would have experienced in a standard size borehole, such as an 8 inch borehole. Thus, element 46 converts the count rate signals already corrected for calibration and dead time according to the following relationship $$CR_c = CR_o + (CR - CR_o)\frac{Y_8 - CR_o}{Y_d - CR_o} \tag{2}$$

where
$CR_c$ (either near or far) is the logarithm of the detector count rate converted to an 8 inch borehole;
$CR_o$ (near or far) is the logarithm of the detector count rate for 100% porosity with an eight inch borehole;
CR (near or far) is the logarithm of the detector count rate in a borehole having a diameter ("d") as measured by caliper 30;
$Y_8$ is the logarithm of the detector count rate in the standard 8 inch borehole and 0 porosity; and
$Y_d$ is the logarithm of the detector count rate in a borehole having a diameter d and 0 porosity. Described earlier, $Y_d$ may be found from equation 1.

After both near and far detector count rates have been appropriately corrected in element 46, the corrected signals ($N_c$ and $F_c$) are then utilized in element 48 to determine a value for formation porosity which is inherently free of the effects due to tool standoff from the borehole wall. This determination is accomplished without the need to explicitly measure the magnitude of the tool standoff.

It has been discovered that the neutron-neutron tool exhibits response characteristics which, when properly understood permit this unique porosity (or other formation characteristic) determination. Specifically, one may determine an "ideal" tool response to variations in porosity in terms of the near and far detector count rates. This "ideal" tool response is determined either experimentally or with calculations of the Monte Carlo type with all elements of the environment of the investigation such as water salinity, borehole size, tool standoff, mudcake thickness, lithology, etc., or casing and cement thickness for a cased well, invariant. In other words, when all environmental effects are held constant, for each value of porosity, there exists, for a tool of a given type, a pair of unique values of the near and far detector count rates. It will be apparent to those skilled in the art that a degree of convenience is to be gained if the logarithms of the near and far detector count rates are used without changing the analysis. Such an "ideal" tool response in terms of the logarithm of the count rates, for "standard" 8 inch borehole conditions, is illustrated at 56 in FIG. 2.

Figure 2:
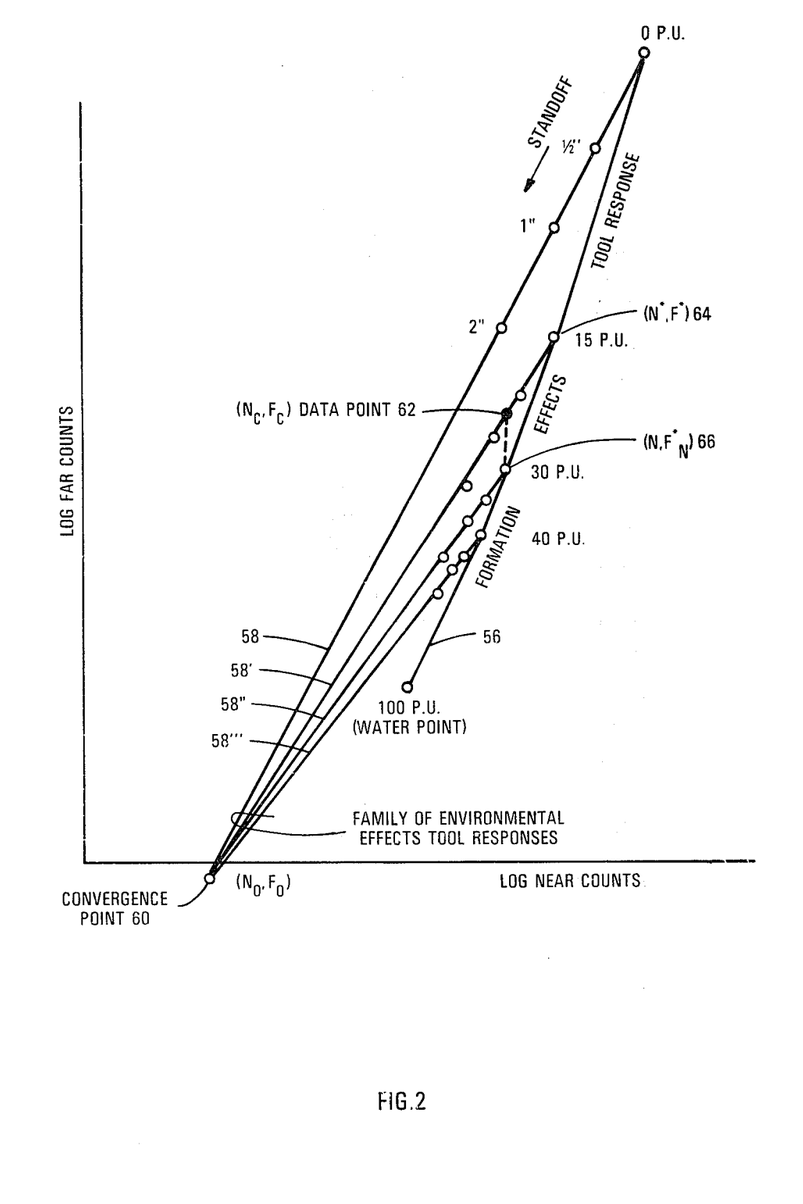
FIG. 2 graphically illustrates the neutron-neutron tool porosity and standoff response characteristics and their relationship therebetween for a standard borehole.

It has also been discovered that for each value of porosity (or other formation characteristic), the pair of values of near and far detector count rates vary when an environmental effect such as tool standoff is varied in a manner which defines a different tool response, examples of which have been illustrated at 58, 58', 58" and 58'". Surprisingly, as can be seen, the family of environmental effects tool responses 58, 58', 58" and 58'" all pass through a unique convergence point 60.

It is the recognition of these unexpected physical properties of the neutron-neutron tool behavior which, when properly applied, can be used to advantage to obtain a value of porosity which is free of standoff effects even though the count rates produced by the neutron-neutron tool in a stood off condition are effected and even though no direct measurement of tool standoff is made.

By referring to FIG. 2, it can be seen how the aforementioned phenomena can be applied to produce such a standoff-free value of porosity. Data point 62 represents near ($N_c$) and far ($F_c$) detector count rates determined by the neutron-neutron tool in a formation of unknown porosity with an unknown value of tool standoff from the borehole wall plotted on a log-log plot. (Borehole size, calibration and dead time corrections have already been made so that $N_c$ and $F_c$ are effective count rates for an 8 inch standard borehole). "Ideal" tool response 56 and coordinates $N_o$, $F_o$ of the convergence point 60 of the family of environmental effects tool responses 58 have been predetermined as explained above to establish tool behavior with constant porosity and varying standoff as well as with constant standoff and varying porosity. Graphically, corrected porosity ($\phi_{cor}$) can be determined by drawing a straight line through points 60 and 62 and determined the point 64 corresponding to detector count rates N* and F* where the straight line intersects the "ideal" tool response curve 56. Mathematically, this is equivalent to solving the following two simultaneous equations that define the two response curves 56 and 58', respectively.

$$F^* = A'(N^*)^2 + B'N^* + C \quad (3)$$

where A', B' and C' are fitting parameters determined from a quadratic fit to the empirically predetermined ideal tool response; and $$\frac{N_c - N_o}{F_c - F_o} = \frac{N^* - N_c}{F^* - F_c} \quad (4)$$

where in equations 3 and 4 all counting rate variables are in terms of their logarithms.

Having determined N*, F* one may then use the above mentioned ideal response to determine corrected porosity (i.e. porosity free of tool standoff effects). One such functional relationship that may be used is the conventional ratio porosity $$\phi_{cor} = f\left(\frac{N^*}{F^*}\right) \quad (5)$$

discussed above in connection with the prior art.

While the above technique can be used to advantage to determine porosity values free of standoff, it can be seen that, in some extreme cases, due to the steepness of the family of curves 58, a minor error in point 62 ($N_c$, $F_c$) will lead to a significant error in N*,F* and consequently in corrected porosity $\phi_{cor}$. Such minor errors in counting rates especially in $F_c$ are to be expected due to the statistical nature of the physics of the neutron-neutron process utilized by the neutron-neutron tool. Thus, it is desirable to provide some smoothing or filtering of the resultant porosity log.

Figure 4:
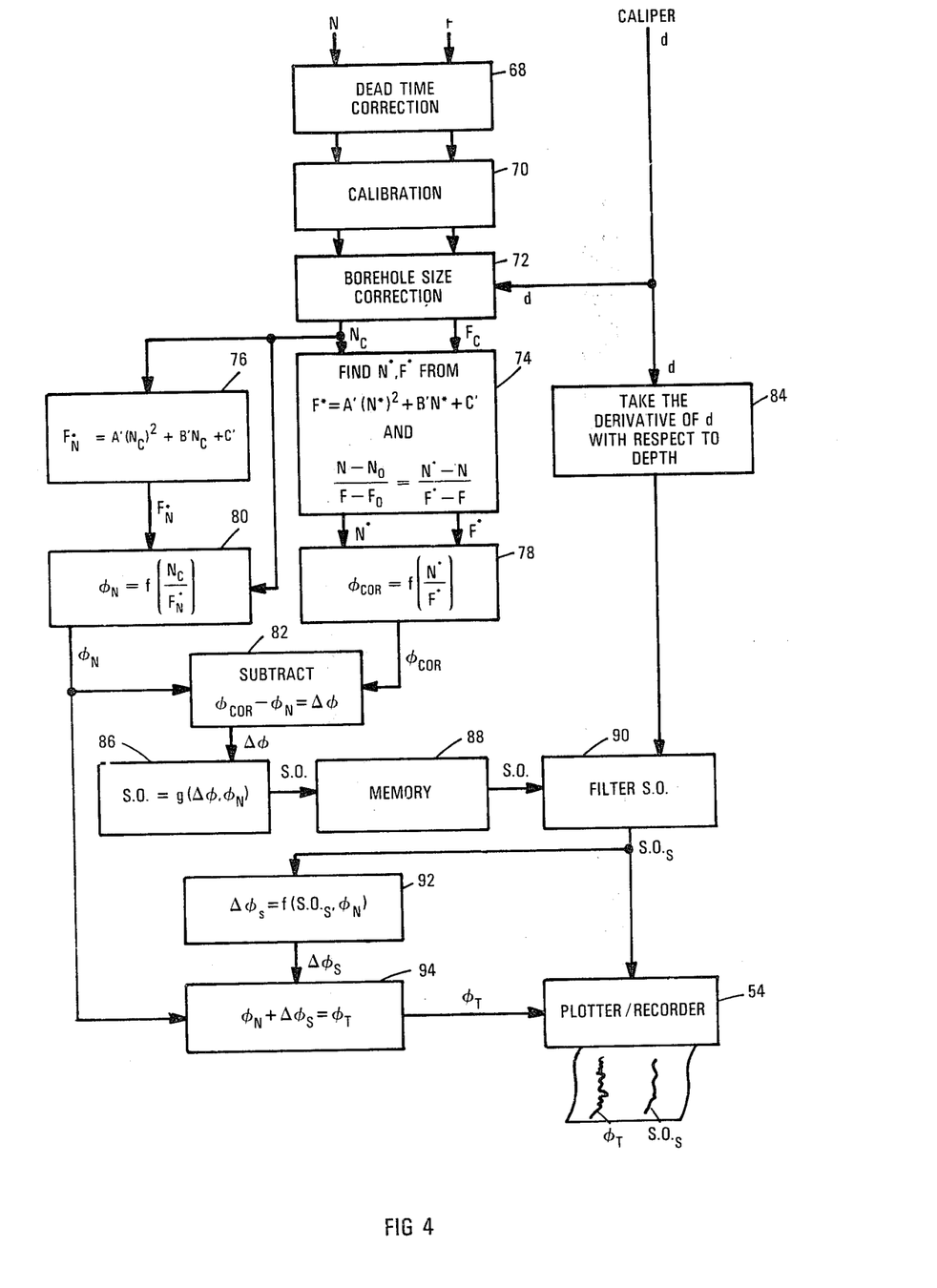
FIG. 4 illustrates in schematic functional block diagram form the various steps for practicing the preferred embodiment of the present invention.

The present invention proposes to accomplish such a filtering or smoothing function in element 50. A side benefit of the steps used to perform the smoothing is a determination of a value of the standoff (S.O.) itself.

In order to stabilize or smooth the porosity log, advantage is taken of the fact that the near detector has a much larger count rate than the far detector and is therefore much less likely to be influenced by the statistical nature of the processes involved. Thus, the statistical uncertainty or error introduced into the determination of $\phi$ is largely due to the far detector count rate. A porosity value determined from only a near detector count rate will be heavily influenced by standoff, however.

In addition, advantage is taken of the assumption that changes in standoff with changing depth in the borehole should be small where changes in borehole size with changing depth is small. In other words, it is assumed that there should be no, or at least slowly changing, tool standoff in a relatively smooth borehole.

Utilizing these assumptions, a filtering or porosity log smoothing technique may be practiced as follows. First, in equation (3), N* is set equal to $N_c$ and $F_N^*$ is determined (the far detector count rate that would exist for a count rate of $N_c$ and no tool standoff). From the point ($N_c$, $F_N^*$) 66 in FIG. 2, a value of porosity, called the near detector porosity $\phi_N$, may be determined using the functional relationship between the porosity and the near and far count rates discussed above, such as $$\phi_N = f\left(\frac{N}{F_N^*}\right).$$

and $\phi_{cor}$ or $\Delta\phi$ is then determined. From an examination of FIG. 2, it will be appreciated that $\Delta\phi$ may be functionally related to standoff (S.O.) This functional relationship $$S.O. = g(\Delta\phi, \phi_N) \quad (7)$$

may be empirically determined for the neutron-neutron tool. Additionally, the inverse relationship $$\Delta\phi = f(S.O., \phi_N) \quad (6)$$

may also be empirically determined. Knowledge of the functional relationship of equation (6) and of the value of $\Delta\phi$ found above enables determination of a value of standoff (S.O.) for the point under consideration.

Now the assumption that standoff will change little as the tool is moved where borehole diameter changes are small, comes into play. Element 50 takes the derivative of the caliper reading with respect to depth. Where the derivative is small, standoff (S.O.), determined for a number of adjacent depths over a depth interval, is smoothed over some preselected depth interval so that standoff (S.O.) is not permitted to vary rapidly. Jitter occasioned by the relatively poor statistics of the far detector count rate is filtered out by an adaptive filter of this type. On the other hand, where the derivative is large, the standoff is not smoothed as dramatically so as to permit the more rapid changes in standoff expected due to the less uniform borehole diameter.

One such filtering or smoothing technique that may be applied with advantage is a weighted average technique with the weights of each of the points contributing to the average being determined by the derivative of the caliper reading. While the above described weighted average filtering technique is preferred due to its relative simplicity, it should be appreciated that any number of alternative filters may be used equally as successfully or more successfully. It is conceivable that an adaptive filter of the Kalman type may be suitable for this application, although such a filter would be somewhat more complex to implement. Nonetheless, the present invention is intended to be broad enough to encompass any suitable filter.

Once a smoothed standoff (S.O.$_s$) has been determined, the inverse functional relationship equation (7) is used to determine a filtered or smoothed value of $\Delta\phi_s$ which, when added to the near detector porosity $\phi_N$, produces the true value of porosity $\phi_T$. This porosity, since it depends on a filtered value of standoff, also has reduced statistical variations and is therefore an improved, smoothed or filtered, porosity value.

Turning to FIG. 4, the above described steps and their inter-relationships can be seen in a functional block diagram. Neutron detector count rates N,F are first corrected for dead time losses in element 68 and are then calibrated for tool response variations in element 70. The corrected near and far detector count rates are then corrected for borehole size effects in element 72 in response to the borehole size measurement of the caliper. This correction produces near and far detector count rate signals $N_c$ and $F_c$ which are equivalent to the effective count rates that would be experienced in a standard borehole such as an 8 inch borehole.

$N_c$ and $F_c$ are next transmitted to functional element 74 in which the equations involving the logarithms of the counting rates representing the ideal tool response descriptive of variations in porosity and the tool response descriptive of variations in standoff are solved simultaneously in order to find adjusted near and far detector count rates N*, F* which are the count rates which lie on the ideal tool response and which have been corrected for tool standoff effects.

Element 78 then converts the standoff corrected near and far count rates N*, F* into a value of corrected porosity by means of an empirically determined functional relationship between corrected porosity and the ratio of the near and far standoff corrected count rates.

In a parallel branch, element 76 utilizes the empirically determined functional relationship between the logarithms of the near and far detector count rates which represents the ideal tool response in order to determine a far detector count rate $F_N^*$ that would exist with a near detector count rate $N_c$ and with no standoff.

Functional element 80 then converts the near detector count rate $N_c$ and the derived far detector count rate $F_N^*$ into a near porosity $\phi_N$ value through the empirically determined functional relationship between porosity and the ratio of near to far count rates. Functional element 82 then subtracts the corrected porosity value $\phi_{cor}$ determined by functional element 78 from the near detector porosity value $\phi_N$ derived by functional element 80 in order to obtain the differential $\Delta\phi$ therebetween. This functional relationship can be empirically determined by operating the tool in a plurality of known formations and with known standoff conditions. Functional element 86 then utilizes this standoff/porosity change relationship in response to the porosity change determined by element 82 in order to produce an effective standoff value (S.O.).

The above steps are performed for a plurality of adjacent depths with the results being stored in memory 88. Subsequently, the derivative of the caliper measurement provided by functional element 84 is used as an input to a filtering process performed on the standoff at 90 so as to produce a smoothed value of standoff S.O.$_s$. As discussed previously, the filtering function performed by element 90 may be a weighted average filtering or may be some other acceptable filtering, such as an adaptive Kalman filter. The smoothed values of standoff are subsequently recorded in plotter-recorder 54 so that a tangible representation of a depth varying log of smoothed standoff can be generated. The smoothed standoff values are also delivered to functional element 92 in which the inverse functional relationship between standoff and change in porosity is of use to obtain a smoothed change of porosity W$\phi_s$. $\Delta\phi_s$ is subsequently combined with the near porosity determination delivered from functional element 80 in order to derive an indication of porosity from functional element 94 which represents the true porosity $\phi_T$ of the formation. These values of true porosity of the formation are also transmitted to the plotter-recorder 54 in order to generate a tangible representation of a depth varying porosity log.

Figure 3:
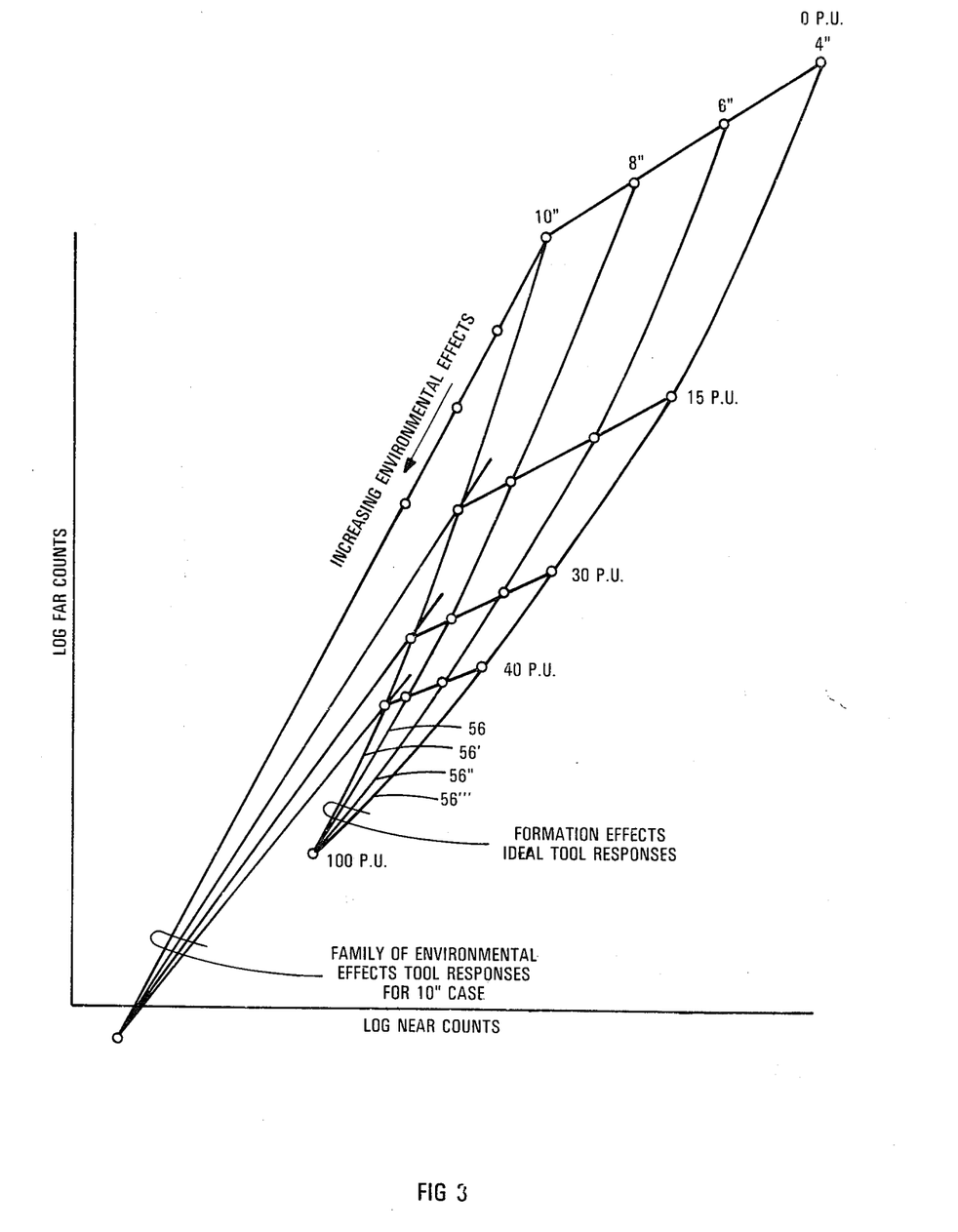
FIG. 3 graphically illustrates the neutron-neutron tool porosity and standoff response characteristics and their relationships for a plurality of standard borehole sizes.
Figure 5:
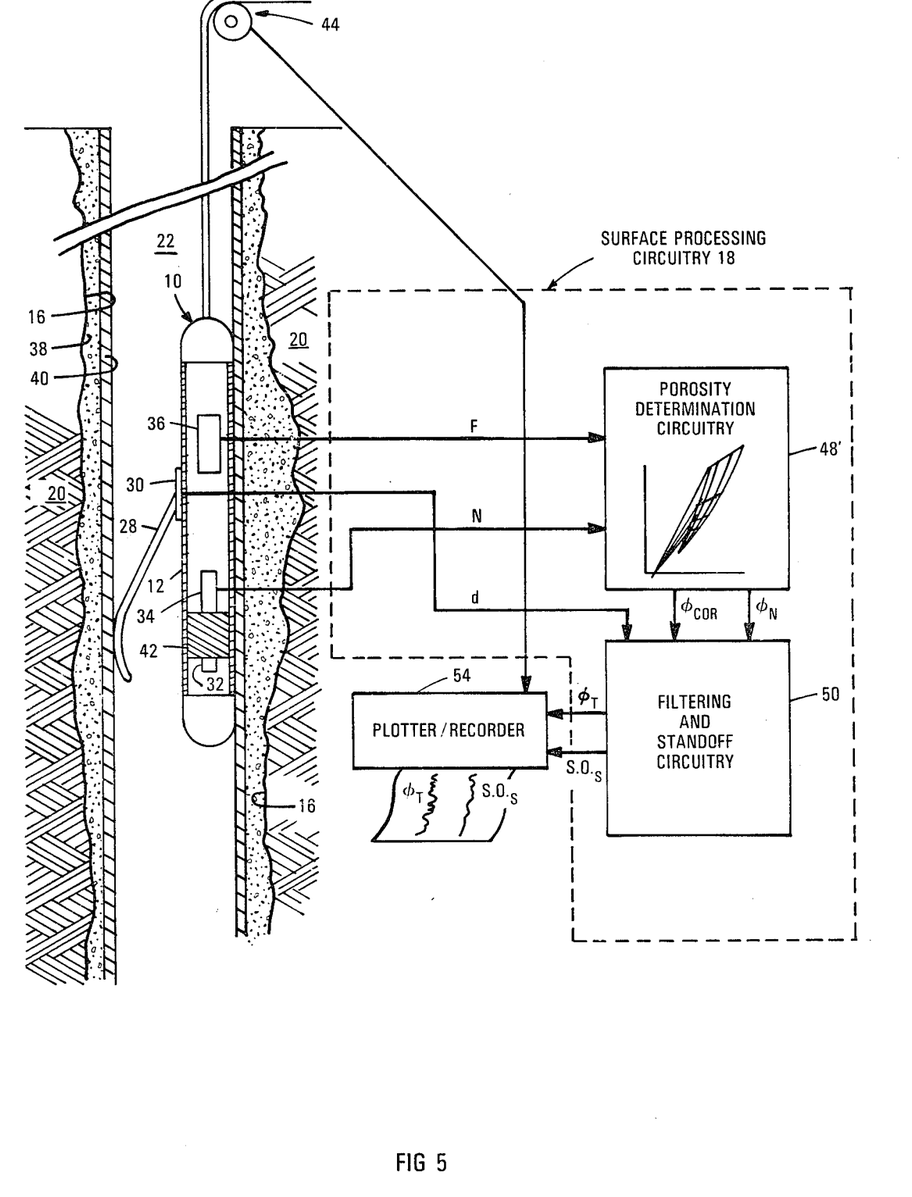
FIG. 5 illustrates in schematic form a second embodiment of the present invention.

Turning now to a consideration of FIG. 5 and of FIG. 3, a second embodiment of the invention will be mentioned in relation with the functional element 48'. As can be seen, FIG. 5 illustrates the practice of the invention in the cased hole situation with 38 and 40 referring to the cement and the casing respectively. While so illustrated, it should be evident that the invention is not limited to this particular environment but may be practiced in the uncased hole environment illustrated in FIG. 1. This second embodiment recognizes and takes advantage of the fact that a unique ideal tool response curve may be empirically determined for each casing or borehole size so that casing or borehole size corrections need not be explicitly made as described above. FIG. 3 thus illustrates a family of ideal tool responses 56, 56', 56'', 56''' respectively corresponding to casings or boreholes having nominal 8, 10, 6 and 4 inch diameters. Each of these ideal tool responses has a corresponding family of environmental (e.g. standoff) effects tool responses 58. In order not to unduly confuse the figure, only the family of environmental effects tool responses corresponding to the 10-inch formation effects ideal tool response 56' have been illustrated.

In practicing the invention, the known casing inside diameter or the caliper measurement of casing or borehole size is used in element 48' to select the proper ideal tool response along with its family of environmental effects tool responses. Utilization of the proper response in effect compensates for variations in the count rates due to the differing effects of different casing or borehole sizes. In other respects, with the exception of the casing or borehole size effects correction, the procedure previously described in relation to FIGS. 2 and 4 is employed. In the event that the caliper indicates a measured borehole size intermediate two of the diameters for which ideal tool responses have been derived, an interpolation procedure well known to those skilled in this art may be employed.

While a specific preferred embodiment has been disclosed and described, it should be apparent that the scope of the claimed invention is more expansive than the specific technique described. For instance, porosity is only one example of a formation characteristic that may be determined by the inventive technique. Similarly, tool standoff is only one example of an environmental effect that may be treated in the above described manner. Other examples of environmental effects include, but are not necessarily limited to, mud-cake thickness, casing and cement thickness, gravel pack quality and fluid salinities. Furthermore, while the invention may be practiced on detector signals indicative of thermal or epithermal neutron count rates as described, it is also possible to practice the invention on signals derived from gamma ray detectors as well as on signals indicative of the total energy deposition in the detectors, so long as the particle detected is indicative of interactions between the source emitted neutrons and the nuclei of the materials in the vicinity of the detectors. Such neutrons, as stated, may be originally produced in any suitable chemical or accelerator source. Finally, FIGS. 2 and 3 and the above description have described the invention in terms of the logarithms of the near and far detector signals. While this is a feature of the preferred embodiment, it should be apparent to anyone skilled in the art that there is nothing critical in the practice of the invention about the use of the logarithm. Therefore, the claimed invention and its practice are not intended to be so limited.

We claim:

1. A method for determining the porosity of a sub-surface geological formation traversed by a borehole comprising the steps of:
   a. passing a neutron logging tool through said borehole while irradiating said formation with neutrons, said neutron logging tool including a neutron source and first and second detectors spaced from said source by different distances;
   b. generating first and second detector signals indicative of interactions between said neutrons and the nuclei of materials in the vicinity of said detectors;
   c. automatically combining said first and second detector signals into a tangible representation of formation porosity inherently free of effects due to tool standoff from said borehole wall without explicitly determining said standoff.

2. A method for determining the porosity of a sub-surface geological formation traversed by a borehole comprising the steps of:
   a. passing a neutron logging tool through said borehole while irradiating said formation with neutrons, said neutron logging tool including a neutron source and first and second detectors spaced from said source by different distances;
   b. generating first and second detector signals indicative of interactions between said neutrons and the nuclei of materials in the vicinity of said detectors;
   c. in response to said first and second detector signals, producing a tangible representation of porosity inherently free of tool standoff from said borehole wall without explicitly determining said standoff; and
   d. generating a tangible representation of said tool standoff determined from said first and second detector signals.

3. The method as recited in claim 2 wherein said first and second detector signals are corrected for borehole size effects.

4. A method for investigating a sub-surface geological formation traversed by a borehole to determine a formation characteristic corrected for the effects of at least one element of the environment of the investigation, comprising the steps of:
   a. passing a neutron logging tool through said borehole while irradiating said formation with neutrons, said neutron logging tool including a neutron source and first and second detectors spaced from said source by different distances;
   b. geneating first and second detector signals indicative of interactions between said neutrons and the nuclei of materials in the vicinity of said detectors;
   c. in terms of the first detector signal and the second detector signal, predetermining ideal tool response unaffected by said at least one element of the environment of the investigation as a function of said formation characteristic;
   d. in response to said first and second signals and to said ideal tool response, producing a signal indicative of said formation characteristic corrected for the effects of said at least one element of the environment of the investigation.

5. A method for investigating a sub-surface geological formation traversed by a borehole to determine a formation characteristic corrected for the effects of at least one element of the environment of the investigation, comprising the steps of:
   a. passing a neutron logging tool through said borehole while irradiating said formation with neutrons, said neutron logging tool including a neutron source and first and second detectors spaced from said source by different distances;
   b. generating first and second detector signals indicative of interactions between said neutrons and the nuclei of materials in the vicinity of said detectors;
   c. in terms of the first detector signal and the second detector signal, predetermining ideal tool response unaffected by said at least one element of the environment of the investigation as a function of said formation characteristic;
   d. predetermining tool response to said formation characteristic in terms of the first detector signal and the second detector signal, as a function of variations in said at least one element of the environment of the investigation;
   e. in response to said first and second signals, to said predetermined tool response to said formation characteristic as a function of variations in said at least one element of the environment of the investigation, and to said ideal tool response, producing a tangible representation of said formation characteristic corrected for the effects of said at least one element of the environment of the investigation.

6. A method for investigating a sub-surface geological formation traversed by a borehole to determine a formation characteristic corrected for the effects of at least one element of the environment of the investigation, comprising the steps of:
  a. passing a neutron logging tool and a caliper through said borehole while irradiating said formation with neutrons, said neutron logging tool including a neutron source and first and second detectors spaced from said source by different distances;
  b. generating first and second detector signals indicative of interactions between said neutrons and the nuclei of materials in the vicinity of said detectors;
  c. in response to said caliper, producing a third signal indicative of borehole size;
  d. in terms of the first detector signal and the second detector signal, predetermining an ideal tool response unaffected by said at least one element of the environment of the investigation as a function of said formation characteristic for each of a plurality of different borehole sizes;
  e. in response to said first and second signals, to said third signal, and to said plurality of ideal tool responses, producing a tangible representation of said formation characteristic corrected for the effects of said at least one element of the environment of the investigation.

7. A method for investigating a sub-surface geological formation traversed by a borehole to determine a formation characteristic corrected for the effects of at least one element of the environment of the investigation, comprising the steps of:
  a. passing a neutron logging tool and a caliper through said borehole while irradiating said formation with neutrons, said neutron logging tool including a neutron source and first and second detectors spaced from said source by different distances;
  b. generating first and second detector signals indicative of interactions between said neutrons and the nuclei of materials in the vicinity of said detectors;
  c. in response to said caliper, producing a third signal indicative of borehole size;
  d. in terms of the first detector signal and the second detector signal, predetermining an ideal tool response unaffected by said at least one element of the environment of the investigation as a function of said formation characteristic for each of a plurality of different borehole sizes;
  e. for each of a plurality of borehole sizes, predetermining tool response to said formation characteristic in terms of the first detector signal and the second detector signal, as a function of variations in said at least one element of the environment of the investigation; and
  f. in response to said first, second and third signals, to said plurality of predetermined tool responses to said formation characteristic as a function of variations in said at least one element of the environment of the investigation, and to said plurality of ideal tool responses, generating a tangible representation of said formation characteristic corrected for the effects of said at least one element of the environment of the investigation.

8. The method as recited in claim 4, 5, 6, or 7 wherein said formation characteristic is porosity.

9. The method as recited in claim 4, 5, 6, or 7 wherein said at least one element of the environment of the investigation is borehole size.

10. The method as recited in claim 4, 5, 6, or 7 wherein said at least one element of the environment is tool standoff from the borehole wall.

11. The method as recited in claim 4, 5, 6, or 7 wherein said at least one element of the environment is the condition of the cement and casing in said borehole.

12. The method as recited in claim 4 or 5 including the step of:
  a. determining the size of said borehole; and
  b. modifying said first and second signals to normalize said signals to a standard borehole size equivalent to the borehole size for which said ideal tool response is predetermined.

13. The method as recited in claim 4, 5, 6, or 7 including the steps of:
  a. passing a borehole caliper through said borehole to generate a signal indicative of borehole size variations;
  b. generating a signal indicative of the effective magnitude of said at least one element of the environment of the investigation; and
  c. filtering said signal indicative of the effective magnitude of said at least one element of the environment of the investigation to generate a filtered signal in response to said borehole size variations.

14. The method as recited in claim 13 further including the steps of predetermining said formation characteristic in response to said filtered signal.

15. The method as recited in claim 4, 5, 6, or 7 wherein said neutron source is a chemical source.

16. The method as recited in claim 4, 5, 6, or 7 wherein said neutron source is an accelerator source.

17. The method as recited in claim 4, 5, 6, or 7 wherein said detectors are thermal neutron detectors.

18. The method as recited in claim 4, 5, 6, or 7 wherein said detectors are epithermal neutron detectors.

19. The method as recited in claim 4, 5, 6, or 7 wherein said neutron logging tool includes both thermal and epithermal neutron detectors.

20. The method as recited in claim 13 wherein said filtering step includes adaptively filtering said signal indicative of the effective magnitude of said at least one element of the environment of the investigation in response to the derivative of said borehole size variation signal.

21. The method as recited in claim 1, 2, 4, 5, 6, or 7 wherein said first and second detector signals are indicative of the total energy deposited in said first and second detectors respectively.

22. A method for determining the porosity of a sub-surface geological formation traversed by a borehole comprising the steps of:
  a. deriving first and second signals indicative respectively of the response of first and second spaced detectors positioned in said borehole to the interactions between neutrons and the nuclei of materials in and around said borehole;
  b. automatically combining said first and second detector signals into a tangible representation of formation porosity inherently free of effects due to positioning of said detectors relative to said borehole wall without explicitly determining said relative positioning.

23. The method as recited in claim 22 further including the step of:
  in response to said first and second signals, producing a signal representative of said relative positioning without explicitly determining said relative positioning.

24. The method as recited in claim 23 further including the steps of deriving a signal indicative of borehole size and correcting said first and second signals in response to said borehole size signal.

25. A method for determining a characteristic of a sub-surface geological formation corrected for the effects of at least one element of the environment of the investigation of said formation from within a borehole traversing said formation, comprising the steps of:
   a. deriving first and second signals indicative respectively of the response of first and second spaced detectors positioned in said borehole to interactions between neutrons and the nuclei of materials in and around said borehole;
   b. in terms of the first detector signal and the second detector signal, predetermining ideal tool response unaffected by said at least one element of the environment of the investigation as a function of said formation characteristic; and
   c. in response to said first and second signals and to said ideal tool response, producing a signal indicative of said formation characteristic corrected for the effects of said at least one element of the environment of the investigation.

26. A method for determining a characteristic of a sub-surface geological formation corrected for the effects of at least one element of the environment of the investigation of said formation from within a borehole traversing said formation, comprising the steps of:
   a. deriving first and second signals indicative respectively of the response of first and second spaced detectors positioned in said borehole to interactions between neutrons and the nuclei of materials in and around said borehole;
   b. in terms of the first signal and the second signal, predetermining ideal tool response unaffected by said at least one element of the environment of the investigation as a function of said formation characteristic;
   c. predetermining tool response to said formation characteristic in terms of said first and second signals, as a function of variations in said at least one element of the environment of the investigation; and
   d. in response to said first and second signals, to said predetermined tool response to said formation characteristic as a function of variations in said at least one element of the environment of the investigation, and to said ideal tool response, producing a signal representative of said formation characteristic corrected for the effects of said at least one element of the environment of the investigation.

27. A method for determining a characteristic of a sub-surface geological formation corrected for the effects of at least one element of the environment of the investigation of said formation from within a borehole traversing said formation, comprising the steps of:
   a. deriving first and second signals indicative respectively of the response of first and second spaced detectors positioned in said borehole to interactions between neutrons and the nuclei of materials in and around said borehole;
   b. producing a third signal indicative of borehole size;
   c. in terms of the first signal and the second signal, predetermining an ideal tool response unaffected by said at least one element of the environment of the investigation as a function of said formation characteristic for each of a plurality of different borehole sizes; and
   d. in response to said first and second signals, to said third signal, and to said plurality of ideal tool responses, producing a tangible representation of said formation characteristic corrected for the effects of said at least one element of the environment of the investigation.

28. A method for determining a characteristic of a sub-surface geological formation corrected for the effects of at least one element of the environment of the investigation of said formation from within a borehole traversing said formation, comprising the steps of:
   a. deriving first and second signals indicative respectively of the response of first and second spaced detectors positioned in said borehole to interactions between neutrons and the nuclei of materials in and around said borehole;
   b. producing a third signal indicative of borehole size;
   c. in terms of the first signal and the second signal, predetermining an ideal tool response unaffected by said at least one element of the environment of the investigation as a function of said formation characteristic for each of a plurality of different borehole sizes;
   d. in terms of the first signal and the second signal and for each of a plurality of borehole sizes, predetermining a plurality of tool responses to said formation characteristic as a function of variations in said at least one element of the environment of the investigation; and
   e. in response to said first, second and third signals, to said plurality of predetermined tool responses to said formation characteristic as a function of variations in said at least one element of the environment of the investigation, and to said plurality of ideal tool responses, generating a signal representative of said formation characteristic corrected for the effects of said at least one element of the environment of the investigation.

29. The method as recited in claim 25, 26, 27 or 28 wherein said formation characteristic is porosity.

30. The method as recited in claim 25, 26, 27 or 28 wherein said at least one element of the environment is the positioning of said detectors relative to said borehole wall.

31. The method as recited in claim 25, 26, 27 or 28 wherein said at least one element of the environment is the condition of the cement and casing in said borehole.

32. The method as recited in claim 25, or 26 including the steps of:
   a. deriving a third signal indicative of the size of said borehole; and
   b. modifying said first and second signals in response to said third signal to normalize said signals to a standard borehole size equivalent to the borehole size for which said ideal tool response is predetermined.

33. The method as recited in claim 25, 26, 27 or 28 including the steps of:
   a. deriving a signal indicative of borehole size variations;
   b. generating a signal indicative of the effective magnitude of said at least one element of the environment of the investigation; and
   c. filtering said signal indicative of the effective magnitude of said at least one element of the environment of the investigation to generate a filtered signal in response to said borehole size variation signal.

34. The method as recited in claim 33 wherein said filtering step includes adaptively filtering said signal indicative of the effective magnitude of said at least one element of the environment of the investigation in response to the derivative of said borehole size variation signal.

35. A system for determining the porosity of a sub-surface geological formation traversed by a borehole comprising:
   a. a neutron logging tool adapted to be passed through said borehole while irradiating said formation with neutrons, said neutron logging tool including a neutron source and first and second detectors spaced from said source by different distances for generating first and second detector signals indicative of interactions between said neutrons and the nuclei of materials in the vicinity of said detectors;
   b. means for automatically combining said first and second detector signals into a tangible representation of formation porosity inherently free of effects due to tool standoff from said borehole wall without explicitly determining said standoff.

36. A system for determining the porosity of a sub-surface geological formation traversed by a borehole comprising:
   a. a neutron logging tool adapted to be passed through said borehole while irradiating said formation with neutrons, said neutron logging tool including a neutron source and first and second detectors spaced from said source by different distances for generating first and second detector signals indicative of interactions between said neutrons and the nuclei of materials in the vicinity of said detectors;
   b. means responsive to said first and second detector signals, for producing a tangible representation of porosity inherently free of tool standoff from said borehole wall without explicitly determining said standoff; and
   c. means for generating a tangible representation of said tool standoff determined from said first and second detector signals.

37. The system as recited in claim 36 further including means for correcting said first and second detector signals for borehole size effects.

38. A system for investigating a sub-surface gelogical formation traversed by a borehole to determine a formation characteristic corrected for the effects of at least one element of the environment of the investigation, comprising:
   a. a neutron logging tool adapted to be passed through said borehole while irradiating said formation with neutrons, said neutron logging tool including a neutron source and first and second detectors spaced from said source by different distances for generating first and second detector signals indicative of interactions between said neutrons and the nuclei of materials in the vicinity of said detectors;
   b. means for storing, in terms of the first and second detector signals, a predetermined ideal tool response to said formation characteristic, said response being unaffected by said at least one element of the environment of the investigation;
   c. means responsive to said first and second signals and to said stored ideal tool response for producing a signal indicative of said formation characteristic corrected for the effects of said at least one element of the environment of the investigation.

39. A system for investigating a sub-surface geological formation traversed by a borehole to determine a formation characteristic corrected for the effects of at least one element of the environment of the investigation, comprising:
   a. a neutron logging tool adapted to be passed through said borehole while irradiating said formation with neutrons, said neutron logging tool including a neutron source and first and second detectors spaced from said source by different distances for generating first and second detector signals indicative of interactions between said neutrons and the nuclei of materials in the vicinity of said detectors;
   b. means for storing, in terms of the first and second detector signals, a predetermined ideal tool response to said formation characteristic, said response being unaffected by said at least one element of the environment of the investigation and for storing a predetermined tool response to said formation characteristic in terms of the first detector signal and the second detector signal, said tool response being a function of variations in said at least one element of the environment of the investigation;
   c. means responsive to said first and second signals, to said stored predetermined tool response to said formation characteristic as a function of variations in said at least one element of the environment of the investigation, and to said stored ideal tool response, for producing a tangible representation of said formation characteristic corrected for the effects of said at least one element of the environment of the investigation.

40. A system for investigating a sub-surface geological formation traversed by a borehole to determine a formation characteristic corrected for the effects of at least one element of the environment of the investigation, comprising:
   a. a neutron logging tool and a caliper adapted to be passed through said borehole while irradiating said formation with neutrons, said neutron logging tool including a neutron source and first and second detectors spaced from said source by different distances for generating first and second detector signals indicative of interactions between said neutrons and the nuclei of materials in the vicinity of said detectors;
   b. means responsive to said caliper for producing a third signal indicative of borehole size;
   c. means for storing, in terms of the first and second detector signals, a plurality of predetermined ideal tool responses to said formation characteristic, said responses being unaffected by said at least one element of the environment of the investigation;
   d. means responsive to said first and second signals, to said third signal, and to said plurality of ideal tool responses for producing a tangible representation of said formation characteristic corrected for the effects of said at least one element of the environment of the investigation.

41. A system for investigating a sub-surface geological formation traversed by a borehole to determine a formation characteristic corrected for the effects of at least one element of the environment of the investigation, comprising:
  a. a neutron logging tool and a caliper adapted to be passed through said borehole while irradiating said formation with neutrons, said neutron logging tool including a neutron source and first and second detectors spaced from said source by different distances for generating first and second detector signals indicative of interactions between said neutrons and the nuclei of materials in the vicinity of said detectors;
  b. means responsive to said caliper for producing a third signal indicative of borehole size;
  c. means for storing, in terms of the first and second detector signals, a predetermined ideal tool response to said formation characteristic for each of a plurality of borehole sizes, said ideal responses being unaffected by said at least one element of the environment of the investigation, and for storing a plurality of predetermined tool responses to said formation characteristic in terms of the first detector signal and the second detector signal, said plurality of tool responses being a function of variations in said at least one element of the environment of the investigation;
  d. means responsive to said first, said second, and said third signals, to said stored plurality of predetermined tool responses to said formation characteristic as a function of variations in said at least one element of the environment of the investigation, and to said stored plurality of ideal tool responses, for producing a tangible representation of said formation characteristic corrected for the effects of said at least one element of the environment of the investigation.

42. The system as recited in claim 38, or 39 including:
  a. means for determining the size of said borehole; and
  b. means for modifying said first and second signals in response to said borehole size to normalize said signals to a standard borehole size equivalent to the borehole size for which said ideal tool response is predetermined.

43. The system as recited in claim 38, 39, 40, or 41 including:
  a. means for generating a signal indicative of borehole size variations;
  b. means for generating a signal indicative of the effective magnitude of said at least one element of the environment of the investigation; and
  c. means for filtering said signal indicative of the effective magnitude of said at least one element of the environment of the investigation to generate a filtered signal in response to said borehole size variation signal.

44. The system as recited in claim 43 including:
  a. means for predetermining said formation characteristic in response to said filtered signal.

45. The system as recited in claim 38, 39, 40, or 41 wherein said neutron source is a chemical source.

46. The system as recited in claim 38, 39, 40, or 41 wherein said neutron source is an accelerator source.

47. The system as recited in claim 38, 39, 40, or 41 wherein said detectors are thermal neutron detectors.

48. The system as recited in claim 38, 39, 40, or 41 wherein said detectors are epithermal neutron detectors.

49. The system as recited in claim 43 wherein said means for filtering includes means for adaptively filtering said signal indicative of the effective magnitude of said at least one element of the environment of the investigation in response to the derivative of said third signal.

* * * * *